United States Patent [19]

Weber

[11] 4,255,652
[45] Mar. 10, 1981

[54] HIGH SPEED ELECTRICALLY RESPONSIVE INDICIA DETECTING APPARATUS AND METHOD

[75] Inventor: Harold J. Weber, Sherborn, Mass.

[73] Assignee: Coulter Systems Corporation, Bedford, Mass.

[21] Appl. No.: 8,058

[22] Filed: Jan. 31, 1979

[51] Int. Cl.³ .......................... G06K 7/08; G07F 1/06; B07C 5/00; G06K 19/06
[52] U.S. Cl. .................................. 235/451; 194/4 F; 209/534; 235/492
[58] Field of Search ...................... 194/4 R, 4 F, 4 G; 235/451, 449, 450, 487, 492, 493; 209/534, 527; 340/149 A; 35/48 B; 283/7

[56] References Cited

U.S. PATENT DOCUMENTS

| 3,092,402 | 6/1963 | Reed | 283/57 |
| 3,485,358 | 12/1969 | Hooker | 209/534 |
| 3,509,535 | 4/1970 | Berube | 209/534 |
| 3,530,281 | 9/1970 | Smeiman | 194/4 F |
| 3,562,497 | 2/1971 | Gastal | 235/492 |
| 3,800,155 | 3/1974 | Potenza | 209/534 |
| 4,029,945 | 6/1977 | Yamada | 235/492 |
| 4,096,991 | 6/1978 | Iguchi | 235/449 |
| 4,114,032 | 9/1978 | Brosow | 235/431 |

Primary Examiner—Robert M. Kilgore
Attorney, Agent, or Firm—Silverman, Cass & Singer, Ltd.

[57] ABSTRACT

Apparatus for detecting and providing a signal from detection indicia that is applied to a substrate such as a controlled document for the purpose of determining the character of the document, the substrate comprising individual substrate members or an elongate relatively continuous substrate member passing through the apparatus at high speed. Speeds of between 10 to 15 linear meters per second are the order of speeds which are contemplated by the invention.

The detection indicia on the controlled document comprises an area or areas which are deliberately applied to the document in a manner which renders the detection indicia substantially more conductive than the substrate.

Detection is effected by establishing a capacitive element with the aid of a charging electrode passing relative to the detection indicia and in such passage inducing a capacitive charge onto the detection indicia following which movement of the charged detection indicia relative to a sensor electrode establishes a second capacitive element. The charge which remains on the detection indicia as it moves into juxtaposition relative to the sensor electrode tends to leak off through coupling with this sensor electrode. The leakage current is used to provide a signal whose amplitude is detected and to operate certain output means such as indicators, ejectors, counters, or the like which will respond in accordance with the character of the detection indicia, for example, its size.

The method of the invention comprises the procedure which is followed using apparatus of the above described type.

A modified form of the invention provides means for reducing if not eliminating interference with detection which might be caused by the edges of a controlled document passing through the detecting apparatus.

19 Claims, 8 Drawing Figures

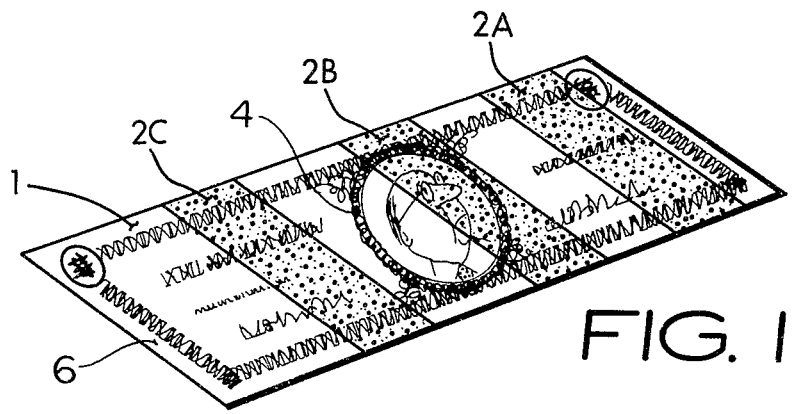
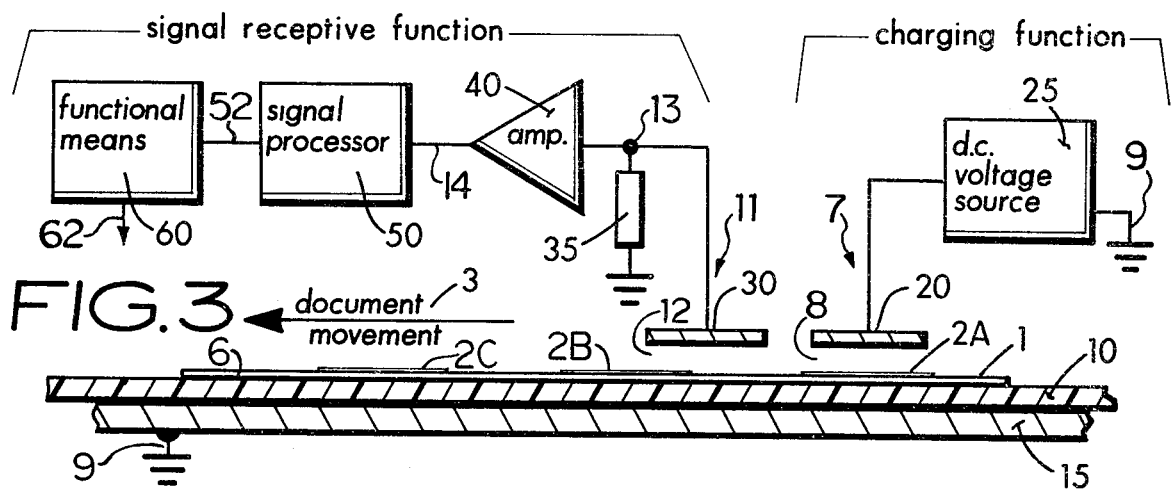
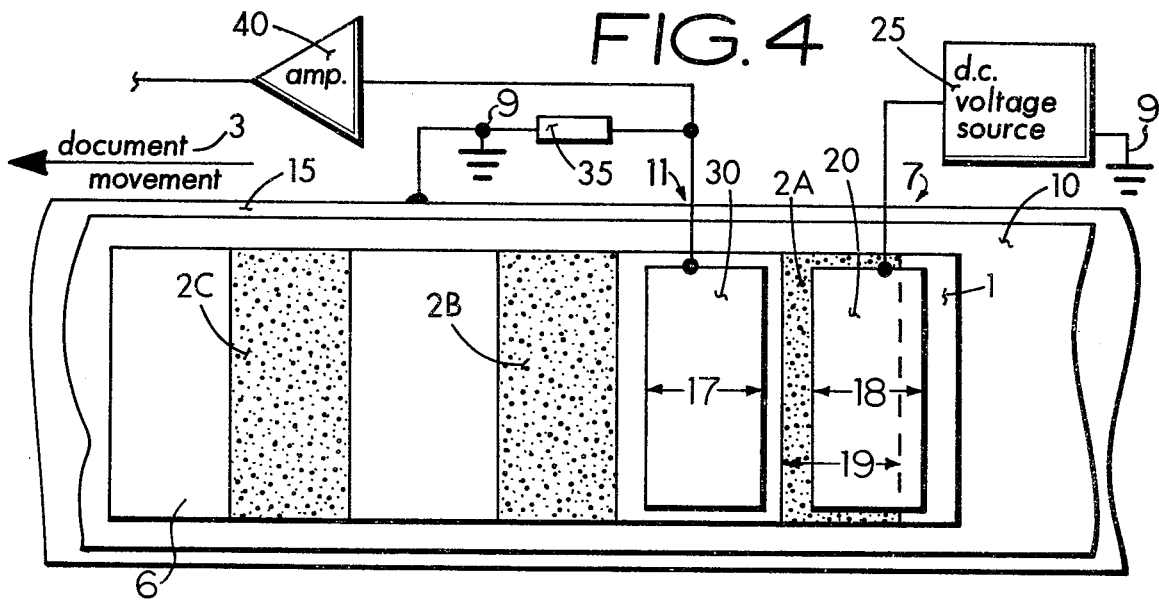

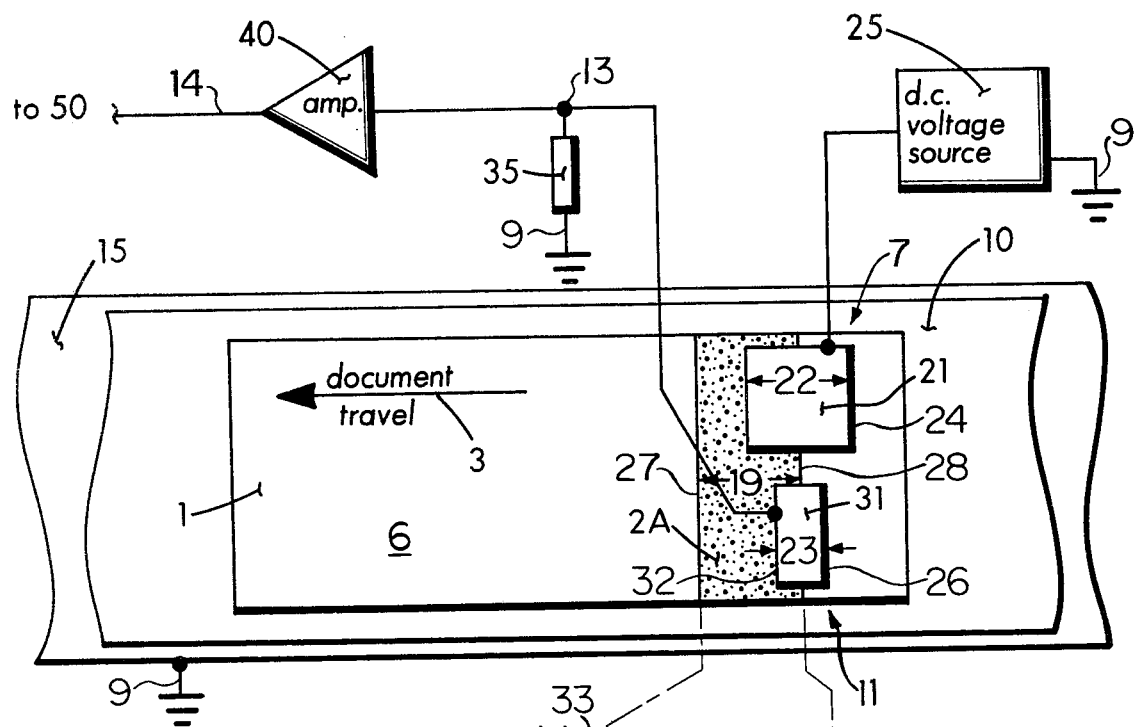
FIG. 5
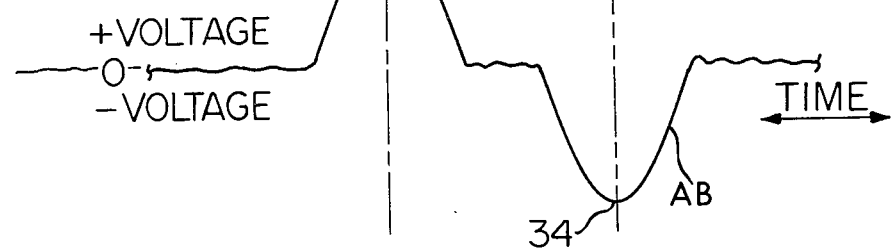
FIG. 6
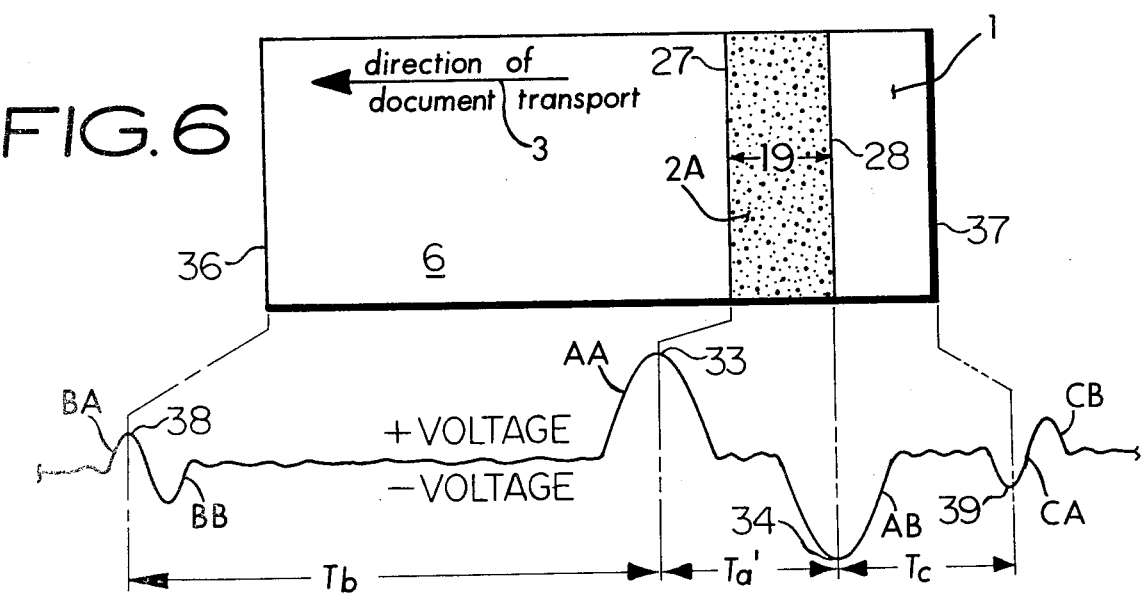

HIGH SPEED ELECTRICALLY RESPONSIVE INDICIA DETECTING APPARATUS AND METHOD

FIELD AND BACKGROUND OF THE INVENTION

The general field of the invention is the detection of the presence of detection indicia on moving members and more particularly this invention is concerned with the detection of indicia which have been deliberately applied to a controlled document which is moving at high speed relative to a detecting apparatus or stations.

Controlled documents as referred to herein comprise stock or other types of certificates, tickets, coupons, bonds and notes, evidence of state obligations and the like which are imprinted with subject matter and patterns that may include dates, values, and other critical information. In the handling of such controlled documents as for example where involved in exchange, redemption, business transactions and the like it is basic that the document be identified as genuine and that its date and/or value be ascertained. Manual handling of such controlled documents depends upon the skill and speed of the handlers to make the necessary identification. In the case of controlled documents which are required to be handled in large volume, even where it may be presumed that all are genuine, such simple matters as counting the documents and coincidentally recognizing and recording their values become difficult. When the genuineness of the documents must be determined simultaneously the difficulty is exacerbated.

The solution to the problem of high speed determination of the character of the controlled documents has been approached by others through the provision of an apparatus which automatically attempts to pass the documents through said apparatus and sense the character of the documents. Some of these approaches are represented by U.S. Pat. Nos. 3,132,242; 3,000,498; and by various apparatuses which are used for detecting and sorting cards and recording information carried thereon. Patents concerned with the latter type of apparatus comprise U.S. Pat. Nos. 2,294,751; 3,519,802 and 2,294,681.

Other prior art which is generally concerned with this field relates to the detection of substances on paper as in U.S. Pat. No. 3,043,993; detecting nonuniformity in electrical cables as in U.S. Pat. No. 3,096,478; and detecting and using information carried on tapes as in U.S. Pat. Nos. 3,440,642; 3,467,957 and 3,422,400.

The functions which can be performed by the apparatus contemplated in accordance with the invention are generally capable of being performed by the prior art devices mentioned above, albeit not with the same reliability and speed. These functions include sorting, ejecting spurious documents, recording information, counting and indicating certain conditions by visual displays and/or oral alarms.

Some of the problems which beset the prior art structures are concerned with the detection of the character of worn and soiled controlled documents and the interference produced by the leading and trailing edges of documents which are being passed individually through the apparatus.

Detection of information carried on cards which are all identical in texture and in which the information is applied by punches or magnetic spots is not as difficult as the detection of information carried on a controlled document which is or may have been in circulation and where the identifying information has been applied in a manner which produces no visibly or mechanically detectable changes in the document.

In the case of the invention, the information is applied by detection indicia which may either be fully integrated with the pattern carried upon the controlled document or which may be applied in a manner which renders the same invisible, not only to human sight but likewise invisible to the type of light beams used for photodetection.

The apparatus which is required to detect the character of controlled documents comprises an expense in any establishment which must be compared with the returns resulting from its use. If the reliability and the speed of the apparatus are insufficient to eliminate the need for human monitoring then the expense of the apparatus will not be justified. The invention is believed to be moe reliable and to operate with greater speed than known apparatus which attempts to do some or all of the functions of the apparatus of the invention.

The apparatus of the invention is adapted for use in the case of either individual controlled documents being passed through the same or in the case of continuous ribbons or webs of substrate material. Successive operations on the controlled document or web can comprise punching, printing, registering, folding, cutting and so forth. These could be in addition to the functions of recording, counting, ejecting, etc.

The detection indicia which is applied to the controlled document, as indicated above, can be integrated with the normal printed pattern, imprinted upon the document or can be invisible in the form of a strip, band or area of some substance which cannot be seen by the human eye. Further, the detection indicia can be of a nature which permeates through the substrate so that it is detectable from either face. As will be explained, one of the requirements of the material from which the detection indicia is formed is that it have a resistivity which differs substantially from the resitivity of the substrate to which or upon which it is applied. In the case of any detection indicia which is permeated through the substrate the apparatus will necessarily have a dielectric layer which separates it from the base or mandrel upon which the document moves to aid in establishing the capacitive elements which will be described.

The invention is believed to be unique in that an apparatus according to the invention is capable of detecting invisible detection indicia carried on worn and even tattered documents where said detection indicia has been practically exhausted or worn off. Further, the invention is important over the prior art from the standpoint that the type of detection which has been mentioned above of worn and used controlled documents can be carried out at linear speeds of the order of 10 to 15 meters per second. Such speeds are attainable even though the detection indicia is invisible.

Another aspect of the invention is that the method and structure of the invention produce a type of signal which is relatively greater than the signals of the prior art devices, with a better signal to noise ratio; hence easier to detect and more reliable.

SUMMARY OF THE INVENTION

Apparatus for detecting and providing a signal from detection indicia applied to a substrate such as a controlled document wherein the detection indicia may be invisible and has a resistivity which is substantially less than the substrate to which it is applied. The signal may be related to the character of the indicia, providing information concerning the nature of the document and such signal or a plurality of signals from documents moving at high speed relative to the apparatus may be used to count, determine genuineness, sort or perform other functions to the document or documents or related thereto.

The apparatus includes means for moving a plurality of documents in sequence relative to a first station where the detection indicia forms a first capacitive element together with a first electrode and a ground plane and which may include the substrate of the document. At the first station, a charge is induced onto the detection indicia by capacitive induction after which the movement of the substrate carries the detection indicia to a second station and a second capacitive element is formed there by the detection indicia, the ground plane, a sensor electrode and the substrate of the document in certain cases. The leakage of the charge from the detection indicia to ground through the sensor electrode at the second station is detected, measured and the information utilized to perform some function related to the character of the document as defined by the detection indicia applied thereto.

One form of the apparatus has the sensor electrode and the second station spaced along the path of movement of the substrate from the charging electrode and the first station. Another form of the invention has the electrodes arranged practically side by side, so that the charging effect and the sensing effect occur closer together timewise, the electrodes being of different size and arranged so that the charging effect occurs first in any event.

Still another form of the invention has additional stations which detect the leading and trailing edges of an individual controlled document and from this information produce a gate signal which passes only the signal or signals derived from the detection indicia without producing interfering signals produced by the leading and trailing edges.

The invention includes methods for practicing the same.

BRIEF DESCRIPTION OF THE DRAWINGS

FIG. 1 is a perspective view of a controlled document having detection indicia applied thereto for use in the apparatus of the invention;

FIG. 2 is a lateral edge-on view of the controlled document of FIG. 1 with the detection indicia applied thereto being shown in exaggerated dimensions;

FIG. 3 is a fragmentary sectional view through part of an apparatus constructed and operating in accordance with the invention, portions of the apparatus being shown in block diagram form;

FIG. 4 is a view similar to that of FIG. 3 but showing the portion of the apparatus which is illustrated mechanically in FIG. 3 in section in a top plan view;

FIG. 5 is a view similar to that of FIG. 4 but illustrating a modified form of the invention and including a chart showing the wave shapes of voltages generated by the sensor electrode during movement of the controlled document through the apparatus;

FIG. 6 is a diagrammatic view illustrating the signals generated by the leading and trailing edges of a controlled document passing through an apparatus of the invention in addition to the signals from the detection indicia;

DESCRIPTION OF THE PREFERRED EMBODIMENTS

Figure 7:
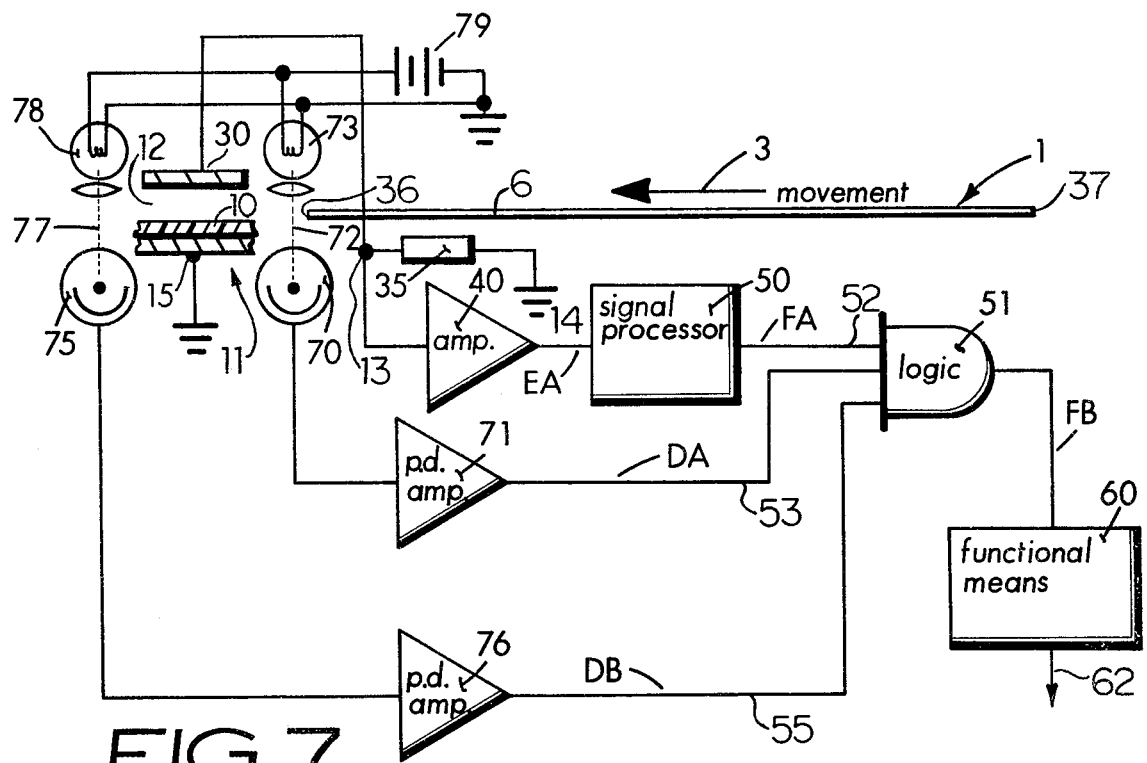
FIG. 7 is a diagram similar to that of FIG. 3 but showing a further modified form of the invention in which means are provided to prevent interference with signals from the leading and trailing edges of the controlled document passing through the apparatus.

The basic invention herein comprises an apparatus for sensing the detection indicia of a controlled document for determining the character of the document as it is being passed at high speed through the apparatus along with a plurality of other similar documents.

The nature of the applied detection indicia and the cooperating apparatus are such that the movement of the document through the apparatus forms a capacitive element at a first station where that element is charged following which the movement carries the document to a second station where another capacitive element is formed and discharged. The apparatus measures the discharge and from this will determine the character of the document. As stated above, controlled documents may be certificates evidencing shares of stock or other ownership, tickets, coupons, bonds and notes, evidence of state obligations and the like. These are imprinted with subject matter and patterns which may include dates, values and other critical information. The apparatus of the invention is intended primarily to sense the detection indicia which has been applied to these controlled documents for any one of a plurality of purposes including ascertaining genuineness, counting, sorting and the like as well as performing mechanical operation upon the documents.

In FIG. 1 there is illustrated a typical controlled document 1 which comprises a rectangular substrate member 6 of paper or the like which has visible indicia or a pattern 4 that has been applied thereto to enable the handling of the document 1 in commerce or exchange or redemption. Such pattern 4 will normally identify the document as to value, name and location of the issuing entity, dates and the like. In accordance with the invention, in addition to the visible indicia or pattern, the document is also provided with detection indicia in the form of three stripes which are illustrated at 2A, 2B and 2C.

The detection indicia stripes 2A, 2B and 2C are shown in the drawings diagrammatically for ease of explanation, but these stripes or bands are not necessarily visible. They may be applied to the substrate 6 in any of a variety of different ways. For example, they can be formed of substances which are impregnated through the substrate 6 of the document 1, they can be applied as printed, sprayed or adhered stripes or bands on the top and/or bottom surfaces of the substrate 6, they can be incorporated into the document by lamination, or they can be integrated into the pattern 4 so as to be not readily visible by the human eye.

Preferably the detection indicia stripes 2A, 2B and 2C are invisible to the human eye and preferably likewise invisible to detection by specialized radiant energy detecting means.

The criterion of the substance of the detection indicia is that it be electrically conductive to a degree which is comparatively much greater than the conductivity of the substrate 6 of the controlled document 1. For example, the detection indicia stripes 2A, 2B and 2C typically have a surface resistivity of one megohm while the substrate 6 has a resistivity which is many times higher, at least about five or more megohms.

The substance from which the detection indicia is formed can be colloidal graphite (known as Aquadag), metallic spray or substances which are conductive to some small degree albeit insoluble so that the stripes 2A, 2B and 2C will not respond to acqueous media. The reason for the latter is of course that the detection indicia would be rendered ineffective on a document that has been inadvertently wetted by water. It could be, for example, some insoluble inorganic salt or organic substance or mixtures thereof.

The detection indicia need not be solid in the respect that it could be in the form of dots, a screen, a pattern or the like. Further, it need not be in stripes or bands, but could be in other configurations. In this specification the detection indicia will be described as stripes but it should be understood that this is only by way of example.

In FIG. 2 the document 1 is illustrated in edge-on view, the substrate member 6 being an elongate rectangle. The detection indicia in the form of the bands or stripes 2A, 2B and 2C are shown applied to the surface of the substrate 6 but it should be understood that this also is by way of example inasmuch as these bonds or stripes could just as well be impregnated into the body of the substrate 6. In addition, since the substrate member normally is paper of a fraction of a millimeter in thickness and the stripes 2A, 2B and 2C are extremely thin whether printed, sprayed or applied in other manner, the dimensions shown in FIG. 2 are greatly exaggerated for the sake of clarity and to aid in the explanation. In the case of the impregnation of the stripes into the body of the substrate 6, the material of the detection indicia may penetrate into the fibres of the substrate and will not be visible in an edge-on view in any event.

In FIGS. 3 and 4 there are illustrated in diagrammatic and block form an apparatus which is constructed in accordance with the invention which may be called a sequential station detecting apparatus because of the arrangement of the charging and detecting electrodes as will be explained.

The controlled document 1 is shown moving to the left in the view as indicated by the arrow 3, being transported by the carrier or belt 10 which is preferably formed of insulating material. The three stripes 2A, 2B and 2C pass seriatim relative to the electrodes mentioned, the first of these being the charging electrode 20 and the second being the detecting or sensing electrode 30, these being spaced apart along the direction of movement of the document 1. It may be assumed that the document 1 is one of a great many such documents that are being carried by a belt 10 and that the speed at which they are moving is quite high, namely - of the order of 10 to 15 linear meters per second. In order to provide a proportionality for visualizing the nature of the apparatus, the example document 1 in this case could be of the order of 6½ by 13 centimeters in width and length, respectively.

The insulating belt or carrier 10 is moved in engagement with a metal base or mandrel 15 which may be defined as the ground plane. The document 1 moves into a first station 7 which is the charging station at which there is disposed a charging electrode 20 that is shown to be rectangular in configuration and spaced above the belt 10. In FIGS. 3 and 4, assuming that the two detection indicia stripes 2C and 2B have already passed through the station 7 the detection indicia stripe 2A is located in the station 7 and is disposed directly under the charging electrode 20.

At this point there is formed a capacitive element, the first plate of which comprises the conductive electrode 20, the air space 8 which comprises the first dielectric layer, the detection indicia stripe 2A which comprises the second plate, the layer of the substrate 6 and the thickness of the insulating belt 10 which together comprise the second dielectric layer and the mandrel 15 which comprises the third plate as the gound plane.

If the detection indicia stripe 2A has been impregnated through the body of the substrate 6, then it would have comprises a conductive element through the document 1. In such case, the substrate 6 would not have contributed to the second dielectric layer but the latter would have comprised the belt 10 by itself. It will follow that if in fact the detection indicia stripes 2A, 2B and 2C are carried on the top surface only of the controlled document 1 there would be no need for the belt 10 to be insulating but instead it could be of metal and comprise the ground plane. If the indicia stripes are both on the top and the bottom surfaces, then the belt 10 must be insulating or some other structure for passing the documents through the apparatus insulating the stripes from ground must be used. It is feasible for example to move the documents through the apparatus on a cushion of air without the need for a belt in which case the belt 10 is eliminated and there is an air space forming a dielectric layer between the detection indicia stripes and the ground plane 15.

The advantage of impregnating the stripes through the thickness of the substrate 6 will become apparent if one considers that there is no need to provide a mechanism for ensuring that the controlled documents pass through the apparatus with a particular surface one way or the other.

Continuing with the description of the apparatus of FIGS. 3 and 4 the charging electrode 20 at the charging station 7 includes the charging electrode 20 which is connected to a source 25 of d.c. voltage whose other terminal is grounded at 9. The d.c. voltage may be of the order of 1000 volts thus providing a field between the electrode 20 and the ground plane 15 whose voltage is divided between the two dielectric layers in accordance with the geometry of the elements. The movement of the belt 10 carrying the detection indicia stripe 2A through the field between the electrodes serves to induce a charge upon the detection indicia stripe 2A by capacitive induction, this charge also being related in value to the geometry of the elements, their distances from one another and the dielectric constants of the dielectric layers.

As the belt 10 continues to move, it carries the controlled document 1 and its detection indicia stripe 2A into a second station which is called the detection or sensor station 11. At the station 11 there is a sensor electrode 30 which now forms a second capacitive element along with the air space 12, the detection indicia stripe 2A, the belt 10 and the ground plane 15. The charge which was induced onto the stripe 2A is now to a certain extent coupled, again by capacitive induction, to the sensor electrode 30. This phenomenon occurs because of the movement of the stripe 2A relative to the electrode 30.

The charge on the electrode 30 is immediately leaked off through the resistor 35 to ground at a rate which depends upon the capacitance of the capacitive element formed at the detection station 11 and the resistance of the resistor 35. Since the value of the capacitance is changing with the movement of the document 1 so will the rate at which the charge leaks off.

The current through the resistor 35 will produce a voltage at the junction 13 which is directly proportional to the current through the resistor. Since this is a variable current (whose general wave shape will be discussed below), the result is a variable voltage at the junction 13 which is applied to the input of an amplifier 40 which can be of conventional construction.

The signal which appears at the output 14 of the amplifier 40 is considerably greater in amplitude than the signal at 13, it being understood that the charge which is capacitively induced on the detection indicia stripe 2A at the charging station 7 is very low so that the charge which remains and is available for capacitive induction to the electrode 30 will result in a very small current flowing to ground through the resistor 35.

The signal from the amplifier which appears at 14 is applied to a component which is designated signal processor 50 in FIG. 3, this component being a circuit or comprising circuits which enable the character of the controlled document to be determined. It can take a variety of forms which are capable of responding to the signal or signals produced at 14.

For example, considering that the signal at 14 is produced from a single detection indicia stripe such as 2A carried on a document such as the controlled document 1 and that there are no other stripes on the document, then the duration of the signal produced will be a measure of the dimensions of the stripe 2A in its direction of travel. The signal processor 50 could have a circuit which measures the duration of the signal and produces an output at 52 which is applied to a structure designated functional means 60 that responds suitable. If the processor 50 is an A/D converter, it could convert the signal at 14 into a digital signal which could be displayed in numerical form by the functional means 60. If the signal is to be used to determine genuineness, for example, the signal processor 50 may comprise some form of comparison device with a reference duration signal contained therein against which the comparison is made. The output at 52 would then be the results of the comparison. Such results could be a measure of the genuineness of the document if the stripe 2A were of a certain predetermined width resulting in a signal of a certain duration. The comparison in the processor 50 would then provide information and instructins by the signal at 52 so that the functional means 60 could pass, reject, sound an alarn, etc. as indicated at 62. The functional means 60 could act upon the document 1 in synchronism with the movement to sort, eject, etc. Perhaps it might be desired to place a mark or a cut or the like on the document 1, this could be performed by the functional means 60 further down the line of movement indicated at 3.

The signal processor 50 may include circuitry which responds to a plurality of sequential signals of different durations and/or spacings apart to provide an output signal at 52 which represents a decision as to one or several characteristics. In such case, the signal processor 50 would have predetermined reference voltages with which the incoming signals are compared. The incoming signals will be stored until the comparison is made after which the decision signal or signals are made. In this manner a special combination of duration and/or spacing signals at 13 would be required to provide an output at 52, or if detecting only genuineness, to prevent an output at 52.

Those artisans skilled in this technology will understand the manner in which the two components 50 and 60 can be constructed. The line 52 can represent several channels and the line 62 can represent several mechanical or electrical functions capable of being performed by the functional means 60.

In FIG. 4 the relative geometric configurations and dimensions of the electrodes 20 and 30 can readily be seen. The optimum signal output at 13 can usually be achieved when the electrode dimension in the direction of travel 3 is the same as the dimension across the detection indicia stripe such as 2A, and this is especially true of the sensor electrode 30. (This concept is not rigid, however, as will be seen in connection with FIG. 5.) This dimension is indicated at 17, 18 and 19 in FIG. 4 for the electrodes 30, 20 and the stripe 2A, respectively. It is further desirable to maximize the first dimension 17 of the sensor electrode 30 in proportion to the first dimension 19 of the stripe 2A so as to reduce the sensitivity of the sensor electrode 30 to response deriving from other than the detection indicia, that is, to signals which may have been produced by pencil marks, creases which may have become conductive because of soil and other small dimension irregularities in the document which might have acquired small charge or charges in passing the charge electrode 20. It should be noted that little improvement is to be expected by utilizing a sensor electrode first dimension 17 which exceeds the detection indicia first dimension 19.

As mentioned above, the insulating belt or carrier 10 is shown passing over a plate or mandrel 15 which comprises the ground plane, being grounded at 9. If the document 1 is transported in air without a carrier or belt 10, the part of the capacitive element formed at the respective stations 7 and 11 between the controlled document and ground will comprise the parasitic capacitive coupling to ground which is usual for any practical apparatus.

A discussion of the details of the theory of operation of the apparatus is in order at this time.

It is believed that when the controlled document 1 passes through the charging station 7 the document 1 receives some value of charge by capacitive induction which is rapidly conducted or spread throughout the entire document by conduction, notwithstanding the fact that the substrate 6 is insulating material. The conductivity is quite low but finite. When a stripe of the detection indicia such as 2A, 2B or 2C of different conductivity passes under the charging electrode 20 at the station 7, a further charge is induced on the particular stripe which is additive to that which may already be carried on the substrate 6 of the controlled document 1.

According to the theory being discussed, because of the contrasting conductivity of the detection indicia and the substrate 6 any charge which is applied to the detection indicia will not immediately bleed or leak off throughout the substrate. The essence of the invention, then, lies, at least in part, on the rapid sequential sensing of any induced charge which remains on the detection indicia before charge dissipation can occur. This unique quality of the invention provides an apparatus which can respond reliably to detection indicia carried by controlled documents which are in a worn, creased and even ragged condition as well as those which are generally in good condition.

FIG. 5 illustrates another form of the invention which can be used for the same purposes as the embodiment which has been thus far described.

In FIG. 5 the controlled document 1 may be considered the same as previously described, but in this case only one detection indicia stripe 2A is shown. The apparatus which is illustrated has the charging station 7 and the sensor or detection station 11 closer together in the dimension of travel and laterally of one another. The electrodes 21 and 31 comprise the charging and sensing electrodes, respectively, and as seen from the view they are arranged laterally of one another rather than sequentially along the length of travel. The electrodes are thus much smaller in their lateral or second dimensions than they are in the apparatus of FIGS. 3 and 4. As for the first dimension of each electrode, the first dimension 22 of the charging electrode 20 is again about the same as the first dimension 19 of the detection indicia 2A but the first dimension 23 of the sensor electrode 31 is substantially smaller than the first dimension 22. The two electrodes 21 and 31 are substantially aligned laterally, that is across the direction of travel indicated by the arrow 3 which, by virtue of their different first dimensions, causes the first edge 24 of the charging electrode 21 to pass over the detection indicia stripe 2A before the first edge 26 of the detecting or sensor electrode 31 does so. The leading edge 27 of the stripe 2A has already passed both stations 7 and 11 in FIG. 5.

While this would seem to be in contradiction to the theory discussed in connection with FIGS. 3 and 4 where it was stated that a preferred first dimension for the sensor electrode is to have it be the same as that of the detection indicia stripe, the apparent reason for departure from that concept will become clear shortly. Basically, the operation of the side by side arrangement of electrodes is somewhat different electrically from the operation of the sequential arrangement of the electrodes.

In the case of the apparatus of FIG. 5, the charging electrode 21 has a first dimension 22 which is approximately the same as the first dimension 19 of the detection indicia 2A. This establishes a condition for the maximum capacitive induction of charge to the detection indicia stripe 2A from the capacitive element formed when the charge electrode 21 and the said detection indicia strip 2A are vertically aligned; however, this charge will start to build up as movement occurs because the first edge 24 meets and commences to pass over the detection indicia strip 2A before the first edge 26 starts to pass over said stripe 2A. In other words, the two capacitive elements which are formed at the respective stations 7 and 11 are formed in overlapped time relationship, one forming before the other but being partially formed as the other is started. Thus, there is no appreciable dissipation of the charge provided by the station 7 before that charge is detected by the sensor electrode 31 so that even though the sensor electrode 31 is so much smaller than the electrode 30 of FIGS. 3 and 4, the signals which it is capable of producing may be as great or larger.

Attention is invited to the following formulas which attempt to some degree to explain the operation of the apparatus of FIG. 5:

$$E_{c2} = K_1(E_{c1}/d_{t2}) \quad (1)$$

$$E_{c3} = K_2(E_{c2}/d_{t2}) \quad (2)$$

Where:
 $E_{c1}$ = Electric field potential of charging electrode 21;
 $e_{c2}$ = Electric field potential INDUCED onto detection indicia strip 2A;
 $E_{c3}$ = Electric field potential INDUCED onto sensor electrode 31;
 $d_{t1}$ = Rate of change between charging electrode 21 and stripe 2A;
 $d_{t2}$ = Rate of change between stripe 2A and sensor electrode 31;
 $K_1$ = Induction coupling efficiency between charging electrode 21 and detection indicia strip 2A;
 $K_2$ = Induction coupling efficiency between stripe 2A and sensor electrode 31.

The above formulas demonstrate that there are two separate charge induction systems in the apparatus of FIG. 5. Furthermore it is shown from formula (2) that the highest instantaneous signal voltage $E_{c3}$ is achieved when the potential $E_{c2}$ of the detection indicia stripe 2A is at a maximum.

If the electrodes 21 and 31 were of the same first dimension and arranged to have their first edges 24 and 26 cross the leading edges 27 of the detection indicia strip 2A simultaneously the charge induced onto the indicia stripe 2A would be detected by the sensor electrode 31 and suitable signals could be obtained at junction 13 to enable the operation of the apparatus. In this case the stations 7 and 11 would be aligned and the entire procedure of transfer of charge would be occurring simultaneously. The basic principles of the invention would still be utilized, but not with the advantages which are inherent in the staggered arrangement of FIG. 5.

In such a parallel arrangement as described, that is, where the electrodes 21 and 31 are of the same size and cross the detection indicia stripe 2A simultaneously, the overall response sensitivity will not provide the increased charge potential $E_{c2}$ of the detection indicia stripe 2A which was pointed out as a criterion for the maximum response. Furthermore, the voltages which are generated through movement, which of course must be transferred eventually to the amplifier 40 will be in this manner adversely affected by irregular edge conditions of the detection indicia stripe 2A. These could be caused by wear or poor original application of the material of the detection indicia stripe 2A. In the case of the staggered arrangement of FIG. 5 it has been found that the adverse effects are to some extent reduced because the capacitive induction of charge at station 11 does not commence until the charge on the stripe 2A has built up to a substantial value. An additional improvement can be achieved by increasing the first dimension 22 of the charging electrode 21 so that it is greater than the first dimension 19 of the detection indicia stripe 2A.

The wave forms shown in FIG. 5 represent the voltage induced on the sensor electrode 31 while the controlled document 1 is passing through the station 11. It should be remembered that this voltage is effected by reason of a charge being twice capacitively induced. The charge is first capacitively induced onto the detection indicia stripe 2A by movement of the controlled document 1 relative to the electrode 21 with the detection indicia stripe 2A cutting the potential field lines established by the voltage source 25 connected across the formed capacitive element at the station 7. The charge formed on the detection indicia stripe 2A is then capacitively induced onto the electrode 31 by movement of the controlled document 1 relative to the electrode 31 with the formed charge on the detection indicia stripe 2A establishing the potential field lines in the capacitive element at the station 11.

As the leading edge 27 of the detection indicia stripe 2A approaches the first edge 26 of the sensor electrode 31 in moving from right to left in FIG. 5, the voltage at the junction 13 follows the voltage induced onto the sensor electrode 31 in the form of a peaked wave which will have a duration depending upon the speed of movement of the controlled document 1 relative to the electrode 31 and an amplitude which depends upon the factors mentioned in connection with the formulas (1) and (2). The result is a wave shape which may be quasi-sinusoidal as indicated at AA, reaching its peak 33 when the electrode 31 is substantially centered on the leading edge 27. This is representative of the effective edge of the electric filed produced by the detection indicia stripe 2A, and is equivalent to the leading edge 27.

The voltage signal thereafter subsides to zero as the second edge 32 of the electrode 31 is passed by the leading edge 27 of the stripe 2A. Thereafter, as the trailing edge 28 of the detection indicia stripe 2A approaches and crosses the first edge 26 of the sensor electrode 31 the voltage reverses and becomes increasingly negative until it reaches a maximum peak 34 at the point that the sensor electrode 31 is centered over the effective edge of the electric field produced by the detection indicia stripe 2A, which will be substantially at the trailing edge 28. The resulting wave shape is shown at AB and it subsides to zero as the first edge 26 of the sensor electrode 31 effectively clears the trailing edge of the electric field emanating from the detecting indicia stripe 2A. As stated above, this will substantially coincide with the geometric trailing edge 28 of the stripe 2A.

The time between the peaks 33 and 34 is designated $T_a$ and has been expanded in relation to the dimensions of the controlled document 1 in the view for clarity. By suitable measurement and comparision with the speed of the movement of the document 1 it is feasible to determine the precise first dimension 19 of the detection indicia stripe 2A. Thus, if the time $T_a$ measures 1.27 milliseconds and the document travel rate is known to be 10 meters per second, it can be readily computed in the signal processor 50 that the first dimension 19 of the stripe 2A is 12.7 millimeters. The computation can be effected by first measuring the time $T_a$ through the use of peak-to-peak detectors and time measuring circuits. The measured dimension can be compared with reference dimension provided for enabling the processing of the information.

FIG. 6 is a diagrammatic view which shows in more detail the signal spectrum usually associated with the movement of a typical controlled document 1 through an apparatus which is constructed in accordance with the invention, either of the form shown in FIGS. 3 and 4 or the form of FIG. 5.

In FIG. 6, the controlled document 1 is depicted with a single detection indicia stripe designated 2A carried on the substrate 6 and having the leading edge 27 and the trailing edge 28. For the purpose of explaining the diagram, reference will be made to a leading edge 36 of the document 1 and a trailing edge 37. The time base of the wave shapes is again expanded for clarity as in FIG. 5.

Again in this case it should be considered that the spectrum of wave shapes shown comprises the voltages which will be appearing at the juncture 13 and which will normally be applied to the amplifier 40. In this figure, the singals AA and AB and their respective peaks 33 and 34 are the same as those of FIG. 5. They could as readily have been developed by the stripe 2A in the apparatus of FIGS. 3 and 4 but the time $T_a$ in the latte case would be greater than in FIG. 5. In FIG. 6 the equivalent time is designated $T_a'$ to indicate that it is the equivalent although not precisely the same as $T_a$ derived from the laterally positioned staggered electrodes 21 and 31 necessarily.

It has been established above that the time duration $T_a'$ is related to the first dimension 19 of the detection inidicia stripe 2A. Prior to the occurrence of the signals AA and AB the leading edge 36 of the document will be passing through the stations 7 and 11 in sequence at the first of which there will be some charging of the substrate 6 and at the second of which there will be some discharging of the substrate 6 because of the finite resistivity of the material of the substrate, the charging and discharging being effected by capacitive induction. Thus the leading edge 36 will generate a small set of signals Ba and BB the peak 38 of the first of these signals BA occurring at the time T, before the peak 33. Likewise the trailing edge 37 of the controlled document 1 will generate a set of reverse polarity signals CA and CB the peak 39 of the first of these, CA, occurring at a time $T_c$ following the end of the time $T_a'$.

The two sets of document edge signals vary in magnitude relative to the main signals AA and AB and are induced by the parasitic charge on the substrate 6 of the document 1. It is even possible for the document edge parasitic signals BA-BB and CA-CB to be substantially of the same order or even greater than the signals AA and AB which are the critical signals needed for ascertaining information about the controlled document 1. The effect could thus be adverse in that the desired signals are masked or distorted and/or false information is provided to the signal processor 50.

The apparatus of FIG. 7 which will be explained in connection with the diagram of FIG. 8 will provide means for decreasing if not eliminating the problem which is discussed in connection with FIG. 6.

In FIG. 7 much of the structure which is shown in previous figures is omitted for clarity but must be assumed to be present. The controlled document 1 is shown being moved to the left as indicated by the arrow 3 to the stations 7 and 11, only the station 11 being illustrated fragmentarily. The document 1 may be presumed to carry detection inidica stripes which are not shown in FIG. 7 and likewise none of the station 7 is illustrated.

According to the structure of FIG. 7 extraneous signals which are produced by the leading and trailing edges of controlled documents are ignored by the apparatus by suitable blanking or gating structure which passes only the signals produced by the detection indicia stripes.

As the leading edge 36 of the controlled document 1 arrives at a light beam 72 produce by the lamp 73 across the power supply 79 it interrupts the light beam 72 at the time $T_1$. This light beam is directed to a photodetector 70 which, prior to interruption of the beam 72 was providing an output which comprised a constant signal coupled to the photodetector amplifier 71 whose output signal is applied through the input line 53 of the AND logic element 51 as a LOW or ZERO comprising base line 54 signal DA. When the light beam 72 is interrupted, the signal output from the amplifier rises to a higher level as indicated at DAA. So long as the beam 72 is interrupted which will occur for the complete length of the controlled document 1 the signal output at the line 53 will consist of the HIGH or ONE signal DAA. As soon as the document 1 has passed through the sensor 11 and its trailing edge 37 passes the beam 72 at the time $T_7$, the signal output from the amplifier 71 on the line 53 becomes a LOW or ZERO signal 54 once more.

Figure 8:
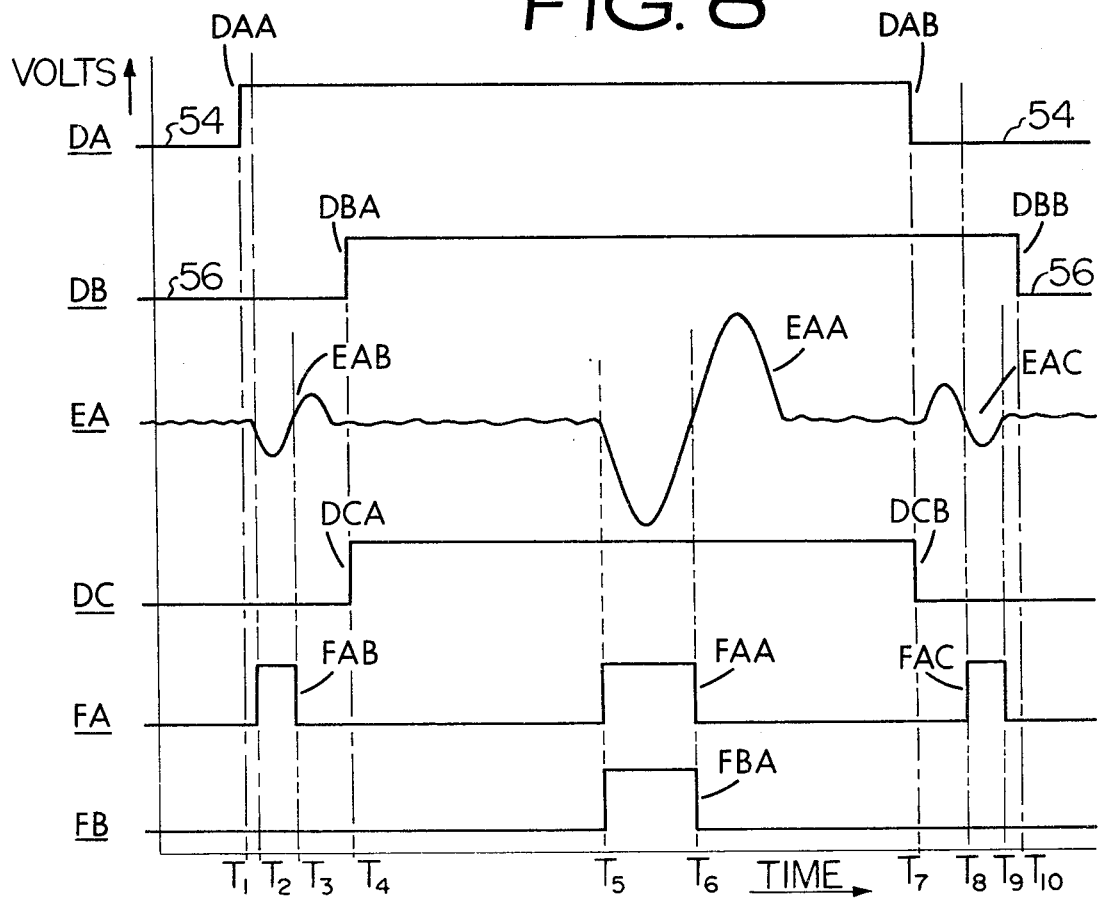
FIG. 8 is a chart showing the pertinent wave forms generated in the apparatus of FIG. 7 on a common time base.

The above described effect is shown in the graph of signal DA of FIG. 8. The DA signal is indicated in the circuit-block diagram of FIG. 7.

A second light beam 77 is interposed in the path of the controlled document 1, this being provided by the lamp 78 that is excited by the same power supply 79, the light beam being focussed on the photodetector 75 which is coupled to the photodetector amplifier 76. When the beam is not interrupted the output of the amplifier 76 comprises a LOW or ZERO that appears on the input 55 as the base line 56 shown in the graph of signal DB of FIG. 8. This line 55 provides a second input to the AND logic element 51. When the leading edge 36 of the controlled document reaches the light beam 77 and interrupts the same at the time $T_4$, the output of the amplifier 76 on the input 55 suddenly changes to a HIGH or ONE and remains thus until time $T_{10}$ when the trailing edge 37 passes at which time the signal on the input 55 once more reverts to the LOW or ZERO which is shown at 56.

The signals which are produced at the junction 13 due to the passage of the document 1 relative to the sensor electrode 30 and which are passed through the amplifier 40 to appear at the line 14 are shown in the graph of signal EA of FIG. 8. From the signal identified in FIG. 7 it can be seen that these signals are passed through the signal processor 50 and emerge on the output 52 as a third input to the AND logic element 51 as the signals shown in the graph of signal FA of FIG. 8.

The document signal produced at 14 by the leading edge 36 of the document passing through the station 11 comprises the signal EAB starting at time $T_2$; that produced by the detection indicia stripe comprises the signal EAA starting at time $T_5$; and that produced by the trailing edge 37 of the document comprises the signal EAC starting at the time $T_7$. The time relationships are all on the same time base. The signals are reversed in polarity from those previously shown herein, but this is only demonstrative of the fact that polarity of the power supply such as 25 is a matter of choice. Whether the first of the wave forms is positive or negative may readily be chosen for convenience in designing wave-shaping circuits to achieve the desired ends of the apparatus.

If the effect upon the AND logic element 51 of the two signals DAA and DBA is considered, the result will be the graph of signal DC of FIG. 8. Both inputs 53 and 54 must be HIGH or ONE for any enabling effect to be produced and hence it will be seen that the only time that this occurs is between the times $T_4$ and $T_7$ thus giving rise to an enabling signal or gate that starts at DCA and finishes at DCB. It will be recalled that the time $T_4$ is when the leading edge 36 interrupts the beam 77 and hence has already passed through and can have no effect upon the signals produced at the station 11 by the said leading edge 36. Also the time $T_7$ is when the trailing edge 37 has uncovered the light beam 72 and this occurs substantially before that trailing edge reaches the sensor station 11 so that the trailing edge 37 passing through the station can have no effect upon the signal produced by the sensor electrode 30.

The signal processor 50 in this case may be arranged to produce a saturated or square wave any time that the input at 14 is negative going. Thus, if the graph of the signal EA is considered, it is negative going only between the times $T_2$ and $T_3$, $T_5$ and $T_6$ and $T_8$ and $T_9$. The resulting output comprises the three square waves FAB, FAA and FAC which are shown in the graph of signal FA. The center square wave FAA represents the signal from the detection indicia stripe while the other two derive from the parasitic signals of the leading and trailing edges.

Looking now at the graphs of signals DC and FA, combining them as would be done by the AND logic element 51, it can be seen that the output of the element 51 comprises the single square wave FBA as shown in the graph of signal FB and this is applied to the input of the functional means 60 as a pure signal which represents only that produced as a result of the passage of the detection indicia stripe through the sensor station 11. The functional means 60 is then free to perform whatever functions have been provided for through the channel or channels 62 without interference from parasitic signals.

Some of the variations of the invention will now be mentioned.

It is feasible to have the controlled document as a long strip or ribbon where various operations are to be performed thereon.

The electrode systems are not limited to single electrodes. For example the electrode 30 which provides the sensing or detection could comprise several electrodes disposed most conveniently for the best signal or for variations in the kind of signals to be applied to the signal processor 50.

The air space 12 is a matter of experiment for the particular apparatus but generally has been found to be satisfactory if chosen to be of the order of 5 millimeters.

The rate of movement of the controlled document through the apparatus affects the absolute signal level while not significantly affecting the signal-to-noise ratio. Thus, although the preferred speed has been stated to be between 10 to 15 linear meters per second, speeds of the order of less than five to twenty or more meters per second have yielded satisfactory performance.

The circuitry of FIGS. 7 and 8 are capable of wide variation. The essence of the teachings thereof is that by suitable circuitry and wave shaping it is feasible to eliminate parasitic signal interference in signal purification. That is, sensing the signals which are attributable only to the passage of the detection indicia stripes through the apparatus. Many other types of circuits could be used with similar effectiveness. The basic idea is to provide means for achieving the best possible signal to be used in the signal processing.

The apparatus of the invention may include signal processing means responsive not only to the size of the detection indicia elements, their spatial relationship to one another, but also their placement with respect to the geometry of the document itself. Thus it might require, as a part of the apparatus, that the location of an edge of the document be represented by some part of reference signal.

While mentioned above, it is believed important enough to repeat that the detection indicia elements applied to the substrate 6 need not be strips or bands but could be circles, diamonds, rings and the like. The electrodes of the apparatus may have to be modified accordingly and even the circuitry may have to be adjusted for this. The elements need not be coherent but could be assemblies or dots or squares or flecks of some relatively conductive material. This need not be on the surfaces but could be laminated into the substrate or impregnated therein. While visible detection indicia elements are included in the invention it is preferred that the elements be invisible to the human eye and also preferably invisible to radiant energy detecting means.

In the claims reference is made to the expression of performing a function that is related to the character of the document. For example, what is intended is to describe the function or functions that would be performed by the functional means 60 through the channel or channels 62. It is pointed out that the function which is being mentioned need not be a positive function but could be a negative function as well. As an example, suppose that the apparatus is arranged to pass controlled documents which are genuine and to eject documents which are spurious. In such case the apparatus could be arranged such that there is no disturbing of the flow or passage of documents so long as their signals indicate that they are genuine but as soon as a spurious one appears the functional means operates a mechanism to push the document off the belt 10. In such case the function being performed while genuine documents are going through the apparatus is a passive one. It is understood that this is included by meaning in the claims.

What is claimed and desired to be secured by Letters Patent of the United States is:

1. In combination with a controlled document which comprises a substrate member of a predetermined conductivity having at least one detection indicia element applied thereto, said element being of a substance which when so applied has a conductivity that is substantially greater than that of the substrate member, the element having a geometry which has a predetermined quantitative relationship to the character of the controlled document, apparatus for detecting the element as the document is transported through the apparatus which comprises:
   A. a charging station including a charging electrode, a ground plane and d.c. power supply means for establishing an electric field between the ground plane and the charging electrode,
   B. a sensor station including sensor electrode means for detecting charge and including circuitry coupled therewith for leaking said detected charge to said ground plane and providing a signal output that is proportional to said detected charge,
   C. means for transporting the controlled document at high speed through the apparatus while carrying the detection indicia element through the charging and sensor stations of the apparatus while maintaining the said document spaced from the charging and sensor electrodes in a manner which establishes a first capacitive element at the charging station and a second capacitive element at the sensor station,
      i. said first capacitive element including at least the charging electrode, a first air space between the charging electrode and the detection indicia element, the detection indicia element and the ground plane, the detection indicia element being spaced from the ground plane when located in said charging station,
      ii. said second capacitive element including at least the sensor electrode, a second air space between the sensor electrode and the detection indicia element, the detection indicia element and the ground plane, the detection indicia element being spaced from the ground plane when located in said sensor station,
   D. the movement in the charging station causing charge to be capacitively induced upon the detection indicia element and in the sensor station to cause charge to be capacitively induced upon the sensor electrode, the duration of the charge in each case being related to geometry of the indicia element,
   E. and means coupled to the circuitry and responsive to the said signal output thereof to perform a function that is related to the character of the document.

2. The combination as claimed in claim 1 in which the stations are disposed sequentially along the path of movement of the controlled document through the apparatus.

3. The combination as claimed in claim 1 in which the stations are disposed side by side along the path of movement of the controlled document through the apparatus.

4. The combination as claimed in claim 1 in which at least the sensor electrode has the same dimension in the direction of travel of the controlled document as the dimension across the detection indicia element in the same direction.

5. The combination as claimed in claim 3 in which the electrode edges which are met by the leading edge of the detection indicia element as it passes through said stations are staggered, the charging electrode edge being met first.

6. The combination as claimed in claim 3 in which the electrodes are in lateral alignment and the dimension of the sensor electrode is less than that of the charging electrode.

7. The combination as claimed in claim 1 in which the detection indicia element is invisible.

8. The combination as claimed in claim 1 in which the detection indicia element is impregnated through the substrate member.

9. The combination as claimed in claim 1 in which the detection indicia element is impregnated through the substrate member, the transporting means includes an insulating carrier member and the thickness of the said carrier member is included in the spacing of the detection indicia element from the ground plane.

10. The combination as claimed in claim 1 in which the detection indicia element is formed of a metallic composition and the substrate member is formed of organic fibrous material.

11. The combination as claimed in claim 1 in which the detection indicia element is formed of a carbon bearing composition.

12. The combination as claimed in claim 2 in which the electrodes are of the same geometric configuration and size.

13. The combination as claimed in claim 1 in which the controlled document comprises an elongate ribbon.

14. The combination as claimed in claim 1 in which the controlled document comprises a single member whose length is moderately greater than its width and has a leading edge which enters the apparatus first and a trailing edge which leaves the apparatus last.

15. The combination as claimed in claim 14 in which means are provided to disable the operation of the operation of the sensor station when the leading and trailing edges of said controlled document are within said station while moving through the same.

16. The combination as claimed in claim 15 in which means are provided for generating signals from the said leading and trailing edges of said controlled document, circuitry are provided to combine said last -mentioned signals into an enabling gate which is effective only in an area spaced inwardly of the said leading and trailing edges of the document, said detection indicia element being located within said last-mentioned area, and said enabling gate being applied to said charge leaking circuitry so that the said signal output includes no signals arising through passage of either of said leading and trailing edges through said sensor station.

17. The combination as claimed in claim 16 in which the last-mentioned signal generating means comprise a pair of light beams disposed respectively before and after the sensor station along the line of movement of said controlled document and photoresponsive means receiving said beams, said beams adapted to be interrupted by the passage of said controlled document to produce said last-mentioned signals.

18. The combination as claimed in claim 1 in which means are provided for measuring the time duration of the signal produced by passage of the detection indicia element through said stations and relating same to the speed of said document whereby to determine the dimension of said element in the direction of travel.

19. The combination as claimed in claim 1 in which said detection indicia element comprises at least one stripe arranged on said document transverse of the direction of travel thereof.

* * * * *